United States Patent
Nenner et al.

(10) Patent No.: US 10,349,387 B2
(45) Date of Patent: Jul. 9, 2019

(54) ENHANCED AND/OR ADAPTIVE COMMUNICATION BETWEEN A TELECOMMUNICATIONS NETWORK AND AT LEAST ONE SECONDARY COMMUNICATION DEVICE VIA OR USING A PRIMARY COMMUNICATION DEVICE

(71) Applicant: Deutsche Telekom AG, Bonn (DE)

(72) Inventors: Karl-Heinz Nenner, Bornheim (DE); Uwe Michel, Koenigswinter (DE); Uwe Janssen, Alfter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 50 days.

(21) Appl. No.: 15/434,074

(22) Filed: Feb. 16, 2017

(65) Prior Publication Data
US 2017/0245256 A1  Aug. 24, 2017

(30) Foreign Application Priority Data
Feb. 18, 2016  (EP) ..................... 16156406

(51) Int. Cl.
*H04L 12/28* (2006.01)
*H04W 72/04* (2009.01)
(Continued)

(52) U.S. Cl.
CPC ......... *H04W 72/0406* (2013.01); *H04W 4/80* (2018.02); *H04W 16/26* (2013.01); *H04W 48/20* (2013.01); *H04W 76/10* (2018.02); *H04W 8/005* (2013.01); *H04W 84/22* (2013.01); *H04W 88/04* (2013.01); *H04W 88/06* (2013.01); *H04W 88/08* (2013.01)

(58) Field of Classification Search
CPC ....................................................... H04J 12/50
USPC .......................................................... 370/329
See application file for complete search history.

(56) References Cited

U.S. PATENT DOCUMENTS

2010/0265872 A1  10/2010 Wu
2012/0238208 A1   9/2012 Bienas et al.
(Continued)

OTHER PUBLICATIONS

Gitlin R D et al: Two-hop-relay architecture for next-generation WWAN/WLAN integration, IEEE Personal Communications, IEEE Communications Society, US, vol. 11, No. 2, Apr. 1, 2004 (Apr. 1, 2004), pp. 24-30, XP011112447.
(Continued)

*Primary Examiner* — Dang T Ton
(74) *Attorney, Agent, or Firm* — Leydig, Voit & Mayer, Ltd.

(57) ABSTRACT

A method for communication between a telecommunications network and a secondary communication device via or using a primary communication device includes: performing a discovery operation regarding the secondary communication device, the discovery operation being initiated either by the primary communication device, by the secondary communication device, or by the telecommunications network; and transmitting at least one control information, being related to the secondary communication device or being related to the result of the discovery operation, between, on the one hand, the telecommunications network, and, on the other hand, the primary communication device and/or the secondary communication device.

12 Claims, 1 Drawing Sheet

(51) Int. Cl.
    *H04W 4/80*    (2018.01)
    *H04W 16/26*   (2009.01)
    *H04W 48/20*   (2009.01)
    *H04W 76/10*   (2018.01)
    H04W 88/06   (2009.01)
    H04W 88/08   (2009.01)
    H04W 8/00    (2009.01)
    H04W 84/22   (2009.01)
    H04W 88/04   (2009.01)

(56) References Cited

U.S. PATENT DOCUMENTS

2012/0250601 A1   10/2012   Choi et al.
2017/0339679 A1*  11/2017   Lee .................... H04W 72/042

OTHER PUBLICATIONS

"$3^{rd}$ Generation Partnership Project; Technical Specification Group Radio Access Network; Evolved Universal Terrestrial Radio Access (E-UTRAN); Relay architectures for E-UTRA (LTE-Advanced) (Release 9)", 3GPP Standard; 3GPP TR 36.806, $3_{RD}$ Generation Partnership Project (3GPP), Mobile Competence Centre; 650, Route Des Lucioles; F-06921 Sophia-Antipolis Cedex; France, No. V9.0.0, Apr. 21, 2010 (Apr. 21, 2010), pp. 1-34, XP050402561.

* cited by examiner

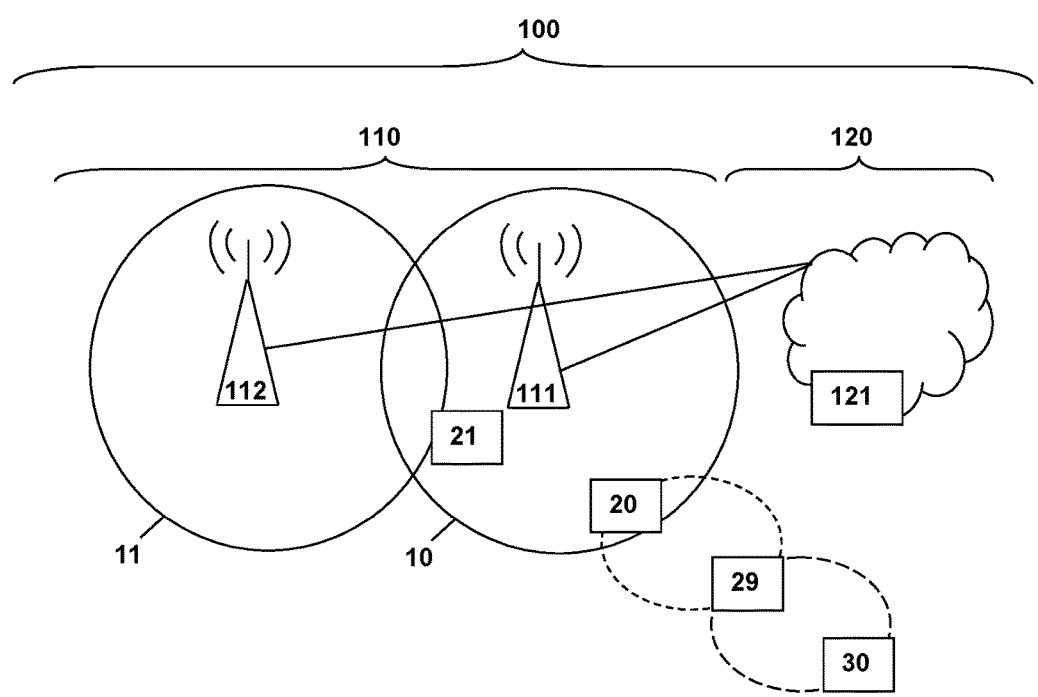

ENHANCED AND/OR ADAPTIVE COMMUNICATION BETWEEN A TELECOMMUNICATIONS NETWORK AND AT LEAST ONE SECONDARY COMMUNICATION DEVICE VIA OR USING A PRIMARY COMMUNICATION DEVICE

CROSS-REFERENCE TO RELATED APPLICATIONS

Priority is claimed to European Patent Application No. EP 16156406.7, filed on Feb. 18, 2016, the entire disclosure of which is hereby incorporated by reference herein.

FIELD

The present invention relates to a method for an enhanced and/or an adaptive communication between a telecommunications network and at least one secondary communication device via or using a primary communication device, wherein the telecommunications network comprises an access network and a core network comprising at least one network node, wherein the primary communication device provides a network termination functionality with respect to the telecommunications network, involving a first control plane (or first non-access stratum) connection being established between the primary communication device and the core network of the telecommunications network such that the primary communication device is directly connected to the telecommunications network using the access network of the telecommunications network, and wherein the secondary communication device is indirectly connected to the telecommunications network, using a local or short range connection.

Furthermore, the present invention relates to a telecommunications network for an enhanced and/or an adaptive communication between the telecommunications network and at least one secondary communication device via or using a primary communication device, wherein the telecommunications network comprises an access network and a core network comprising at least one network node, wherein the primary communication device provides a network termination functionality with respect to the telecommunications network, involving a first control plane (or first non-access stratum) connection being established between the primary communication device and the core network of the telecommunications network such that the primary communication device is directly connected to the telecommunications network using the access network of the telecommunications network, and wherein the secondary communication device is indirectly connected to the telecommunications network, using a local or short range connection.

Additionally, the present invention relates to a system for an enhanced and/or an adaptive communication between a telecommunications network and at least one secondary communication device via or using a primary communication device, the system comprising the telecommunications network, the primary communication device, and the secondary communication device, wherein the telecommunications network comprises an access network and a core network comprising at least one network node, wherein the primary communication device provides a network termination functionality with respect to the telecommunications network, involving a first control plane (or first non-access stratum) connection being established between the primary communication device and the core network of the telecommunications network such that the primary communication device is directly connected to the telecommunications network using the access network of the telecommunications network, and wherein the secondary communication device is indirectly connected to the telecommunications network, using a local or short range connection.

Furthermore, the present invention relates to a program and to a computer program product for an enhanced and/or an adaptive communication between a telecommunications network and at least one secondary communication device via or using a primary communication device.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Likewise, fixed line telecommunications networks typically also provide multiple access to different users of, e.g. an integrated access device or a customer premises equipment.

In some applications, the use of wide area radio access technologies may be impractical or not desired, e.g., due to limitations on power budgets and/or constraints on battery life. Many devices installed in residences, businesses and vehicles are now provisioned or retrofitted with control and monitoring devices that can communicate wirelessly using a low-energy radio access technology to enable connection to other devices.

For example, sensors, light bulbs, audio visual equipment, security system devices, appliances and other devices may be equipped for low-energy, short-range radio communications that operate with dissipation using near-field communications (NFC) and/or Bluetooth technologies, and/or other technologies using, e.g., one of the frequency bands designated for industrial, scientific and medical uses (so-called ISM-bands).

In some situations, there is the need that a communication device having a somewhat local communication range connects to a wide area telecommunications network. Examples of such situations might comprise remote sensors that may require that the sensor be configured to upload sensor data to a server (e.g. a cloud server) from which sensor data can be retrieved through the Internet.

In present day mobile communication networks, it is already known to connect locally communicating communication devices with the (wide area) mobile communication network, or, more generally, a telecommunications network using another communication device, such as a mobile phone. In such situations, the other communication device—such as a mobile phone—typically comprises a first interface for communicating with the telecommunications network—often a radio interface towards a wide area mobile communication network—and additionally a second interface for communicating with the locally communicating communication device. Typically in such situations, it is the other communication device (i.e. the one communicating with the wide area telecommunications network) that is terminating the communication link with the wide area telecommunications network, i.e. it provides a network terminating functionality. Typically, there is no lower level interaction between the (wide area) telecommunications network on the one hand and the locally communicating communication device—only application level communication, e.g., between a health care tracker device worn by a user, the health care tracker device being locally connected to a mobile phone (as the communication device communicating with the wide area telecommunications network), and exchanging data with an application server of a packet data network using the connectivity provided by the mobile phone and the (wide area) telecommunications network towards the application server.

SUMMARY

In an exemplary embodiment, the present invention provides a method for communication between a telecommunications network and a secondary communication device via or using a primary communication device. The primary communication device provides a network termination functionality with respect to the telecommunications network, involving a first control plane connection being established between the primary communication device and the telecommunications network such that the primary communication device is directly connected to the telecommunications network. The secondary communication device is indirectly connected to the telecommunications network, using a local or short range connection between the secondary communication device and the primary communication device, wherein the local or short range connection between the secondary communication device and the primary communication device is a radio and/or wireline connection. The method includes: in a first step, performing a discovery operation regarding the secondary communication device, the discovery operation being initiated either by the primary communication device, by the secondary communication device, or by the telecommunications network; and in a second step, subsequent to the first step, transmitting at least one control information, being related to the secondary communication device or being related to the result of the discovery operation, between, on the one hand, the telecommunications network, and, on the other hand, the primary communication device and/or the secondary communication device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a mobile communication network, as an example of a telecommunications network, the mobile communication network comprising a user equipment as a primary communication device, a secondary communication device being connected to the primary communication device, and a tertiary communication device being connected to the secondary communication device.

DETAILED DESCRIPTION

Exemplary embodiments of the present invention provide a technically simple, and effective solution for an enhanced and/or an adaptive communication between a telecommunications network and at least one secondary communication device via or using a primary communication device such that it is possible to provide a higher degree of flexibility when using the communication devices, and an increased flexibility and efficiency in operating the telecommunications network.

In an exemplary embodiment, the present invention provides a method for an enhanced and/or an adaptive communication between a telecommunications network and at least one secondary communication device via or using a primary communication device, wherein the primary communication device provides a network termination functionality with respect to the telecommunications network, involving a first control plane (or first non-access stratum) connection being established between the primary communication device and the telecommunications network such that the primary communication device is directly connected to the telecommunications network and wherein the secondary communication device is indirectly connected to the telecommunications network, using a local or short range connection, being a radio and/or wireline connection, between the secondary communication device and the primary communication device, wherein the method comprises the following steps:

in a first step, a discovery operation regarding the secondary communication device is performed, the discovery operation being initiated either by the primary communication device, or by the secondary communication device, or by the telecommunications network, in a second step, subsequent to the first step, at least one control information being related to the secondary communication device or being related to the result of the discovery operation is transmitted between, on the one hand, the telecommunications network, and, on the other hand, at least one out of the primary communication device and the secondary communication device.

It is thereby advantageously possible according to the present invention that via the discovery operation additional communication devices—besides the primary communication device—can be made known to the telecommunications network as well as get to know the telecommunications network in the sense of being able to actively communicate with network nodes or instances of the telecommunications network (other than mere application servers of a packet data network that are merely accessible via the telecommunications network) without necessarily being (physically) directly connected to the telecommunications network.

According to the present invention, it is assumed that the primary communication device is connected to the telecommunications network in a classical manner, i.e. the primary communication device is acting as, e.g., a user equipment (especially with regard to a mobile communication network-type network), or as an integrated access device or a customer premises equipment (especially with regard to a fixed line-type telecommunications network). The telecommunications network is especially a mobile communication network and/or a fixed line telecommunications network, or even a combined telecommunications network providing access possibilities typically provided by mobile communication network as well as access possibilities typically provided by fixed line telecommunications networks. Typically, but not necessarily, such a telecommunications network comprises an access network (or an aggregation network) and a core network, the core network typically being the central part of the telecommunications network that provides various services to customers being connected by the access network, these services typically including authentication, authorization, accounting or charging, service invocation, and the like. The use of the terms "access network" and "core network" typically refers to mobile communication networks. The telecommunications network according to the present invention should very well be thought of as being a mobile communication network (and then, an exemplary embodiment of the inventive telecommunications network has—as would be typical for mobile communication networks—an access network as well as a core network). However, the telecommunications network according to the present invention does not necessarily have to be thought of as being a mobile communication network. An exemplary embodiment of the inventive telecommunications network can also be realized as a fixed line telecommunications network (e.g. as a fixed line telecommunications network of a service provider connecting, via an access network of the fixed line telecommunications network, thousands or even millions of private and/or business customers or end users—typically using some kind of digital subscriber line technology—to a backbone network and/or the internet) that often would not be regarded as having a core network. However, also a fixed line telecommunications network, needs to have network nodes being responsible to provide functionality and/or services such as authentication, authorization, accounting or charging, service invocation, etc. to customers being connected to the telecommunications network. According to the present invention, the primary communication device is connected to the telecommunications network in a classical manner which means that the primary communication device provides a network termination functionality with respect to the telecommunications network, involving a first control plane (or first non-access stratum) connection or control plane connection being established between the primary communication device and the telecommunications network (i.e. a network node responsible for such control plane connection; in the case of a mobile communication network, such a network node is typically a network node of the core network of the telecommunications network) such that the primary communication device is directly connected to the telecommunications network (typically using the access network of the telecommunications network, especially in the case of the telecommunications network being a mobile communication network). The first control plane (or first non-access stratum) connection or control plane connection carries signaling traffic and is typically responsible for routing, especially for purposes of system configuration and management.

According to the present invention, a secondary communication device is connected to the primary communication device using a local or short range connection, being a radio and/or wireline connection or link, and the secondary communication device is connected, to the telecommunications network, in an indirect manner via (or using) the primary communication device. However, according to the present invention—and in contrast to the classical connection of such a secondary communication device being connected with the telecommunications network via a primary communication device—it is provided for a control plane connection or at least a control plane-related interaction between the secondary communication device, on the one hand, and the telecommunications network, on the other hand. According to the present invention, in order for this control plane connection or at least control plane-related interaction (of the secondary communication device with the telecommunications network and via the primary communication device) to materialize, a discovery operation regarding the secondary communication device needs to be performed. Hence, in a first step, an exemplary embodiment of the inventive method comprises a discovery operation to be performed regarding the secondary communication device, wherein the discovery operation is initiated either by the primary communication device, or by the secondary communication device, or by the telecommunications network.

Furthermore according to the present invention, in a second step subsequent to the first step, at least one control information, i.e. an information related to a control plane communication, is transmitted between, on the one hand, the telecommunications network (i.e. especially in case of the telecommunications network being a mobile communication network typically at least one network node of the core network of the telecommunications network), and, on the other hand, at least one out of the primary communication device and the secondary communication device. According to the present invention, the at least one control information is related to the secondary communication device or is related to the result of the discovery operation (of the first step).

According to the present invention, it is especially advantageous that the discovery operation can be initiated (or triggered) either by the primary communication device, or by the secondary communication device, or by the telecommunications network.

Examples of the discovery operation being triggered by the primary communication device include situations where upon or after the establishment of the local or short range connection (between the primary communication device and the secondary communication device), the discovery operation is triggered by the primary communication device. Alternatively or cumulatively, it is advantageously possible that the discovery operation is triggered by the primary communication device after a button (e.g. a hardware button and/or a software button) is pressed (or a command executed) on the primary communication device (with or without the local or short range connection being established between the primary communication device and the secondary communication device; in case that the local or short range connection is not established or is not active when the discovery operation is triggered, typically this local or short range connection has previously been established, or an information (especially an identifying or indicating information) is provided—e.g. by a user—regarding the secondary communication device).

Examples of the discovery operation being triggered by the secondary communication device include situations where upon or after the establishment of the local or short range connection (between the primary communication device and the secondary communication device), the discovery operation is triggered by the secondary communication device. Alternatively or cumulatively, it is advantageously possible that the discovery operation is triggered by the secondary communication device after a button (e.g. a hardware button and/or a software button) is pressed (or a command executed) on the secondary communication device (with the local or short range connection being established between the primary communication device and the secondary communication device).

Examples of the discovery operation being triggered by the telecommunications network include situations where the telecommunications network regularly or non-regularly queries the primary communication device regarding active local or short range communication links to secondary communication devices or regarding prior (or previously established) such local or short range connections towards secondary communication devices. Alternatively or cumulatively, it is advantageously possible that the discovery operation is triggered by the telecommunications network (i.e., especially in case that the telecommunications network is a mobile communication network, by a network node of the core network of the telecommunications network) after an indication has been received (typically sent by the primary communication device), by the telecommunications network, that a local or short range communication link towards a secondary communication device is currently established or has been established previously.

According to the present invention, after the discovery operation has been performed, at least one control information, i.e. an information related to a control plane communication, is transmitted, in a second step subsequent to the first step, between, on the one hand, the telecommunications network (or at least one network node of the core network in case that the telecommunications network comprises a core network), and, on the other hand, at least one out of the primary communication device and the secondary communication device. According to the present invention, the at least one control information is related to the secondary communication device and/or is related to the result of the discovery operation (of the first step).

According to a preferred (or first) embodiment of the present invention, a second control plane connection (or second non-access stratum connection) is established between the secondary communication device and the telecommunications network, and wherein the least one control information, being related to the secondary communication device or being related to the result of the discovery operation, is transmitted using the second control plane connection (or second non-access stratum connection).

By establishing the second control plane connection between the secondary communication device and the telecommunications network (while nevertheless the primary communication device provides the network termination functionality with respect to the telecommunications network), it is advantageously possible according to the present invention to actively modify or configure the connection parameters used between the telecommunications network, on the one hand, and the secondary communication device or the primary communication device, on the other hand—especially (but not limited thereto) regarding user plane connections. The second control plane connection preferably has an endpoint within the telecommunications network, i.e. it terminates in a network node of the telecommunications network. This network node is also called the corresponding network node of the telecommunications network, terminating the second control plane connection. In case a core network exists within the telecommunications network, the corresponding network node is preferably a network node of the core network.

According to another preferred (or second) embodiment of the present invention (typically as an alternative to establishing a full blown second control plane connection (or second non-access stratum connection) between the secondary communication device and the telecommunications network (i.e. the corresponding network node or the at least one network node of the core network of the telecommunications network), a connection between the primary communication device and the secondary communication device is used together with the first control plane connection (or first non-access stratum connection) between the primary communication device and the telecommunications network (or, in case of the telecommunications network having a core network, at least one network node of the core network) in order to transmit the at least one control information to or from the secondary communication device.

Likewise by establishing a control plane-related interaction of the secondary communication device with the telecommunications network—i.e. a connection between the primary communication device and the secondary communication device being used together with the first control plane connection (or first non-access stratum connection) in order to transmit the at least one control information to or from the secondary communication device—(while nevertheless the primary communication device provides the network termination functionality with respect to the telecommunications network), it is advantageously possible according to the present invention to actively modify or configure the connection parameters used between the telecommunications network, on the one hand, and the secondary communication device or the primary communication device, on the other hand—especially (but not limited thereto) regarding user plane connections.

According to the present invention, it is preferred that the discovery operation involves the transmission of at least one of the endpoint address parameters of the control plane connection or at least the control plane-related interaction (of the secondary communication device with the telecommunications network and via the primary communication device), i.e. at least one of the endpoint address parameters of the second control plane (or non-access stratum) connection, especially by transmitting the endpoint address of the secondary communication device towards the telecommunications network, especially at least the IP address of the secondary communication device or the IP address of the secondary communication device and a port number, and/or the endpoint address of a corresponding network node of the telecommunications network terminating the second control plane connection (in case of the telecommunications network being a mobile communication network, this corresponding network node could especially be the at least one network node of the core network) towards the primary communication device, especially at least the IP address of the corresponding network node (i.e. especially the at least one network node) or the IP address of the corresponding network node (i.e. especially the at least one network node) and a port number.

Furthermore—especially in case that there is no second control plane connection between the secondary communication device and the telecommunications network—, it is preferred that the discovery operation involves the transmission of at least one of the endpoint address parameters of the connection between the primary communication device and the secondary communication device being used together with the first control plane connection between the primary communication device and the telecommunications network in order to transmit the at least one control information to or from the secondary communication device, especially by transmitting the endpoint address of the secondary communication device towards the telecommunications network, especially at least the IP address of the secondary communication device or the IP address of the secondary communication device and a port number, and/or the endpoint address of a corresponding network node of the telecommunications network terminating the first control plane connection towards the primary communication device, especially at least the IP address of the corresponding network node or the IP address of the corresponding network node and a port number.

By transmitting, as part of the discovery operation, the endpoint address parameters of the control plane connection (of the secondary communication device to the telecommunications network), i.e. the second control plane connection, or the control plane-related interaction (of the secondary communication device with the telecommunications network and via the primary communication device), it is advantageously possible to establish this (second) control plane connection (or non-access stratum connection) between the secondary communication device and the telecommunications network, or at least the control plane-related interaction of the secondary communication device with the telecommunications network and via the primary communication device.

Additionally, it is preferred according to the present invention that the discovery operation involves the transmission of a capability information or a device class information regarding the secondary communication device.

By transmitting a capability information and/or a device class information regarding the secondary communication device as part of the discovery operation, it is advantageously possible to establish the (second) control plane connection (or non-access stratum connection) between the secondary communication device and the telecommunications network, or at least the control plane-related interaction of the secondary communication device with the telecommunications network (and via the primary communication device) in dependency of the capability information and/or the device class information. For example, it is possible and preferred according to the present invention that different network nodes of the telecommunications network (in case of the telecommunications network comprising a core network such network nodes are typically network nodes of the core network) are responsible for different device classes, i.e. dependent on the device class information, the second control plane connection (or non-access stratum connection) is established towards other network nodes of the telecommunications network. Alternatively, it is possible and preferred that different kinds of protocols are used, dependent on the capability information transmitted as part of the discovery operation; e.g. as part of the capability information regarding the secondary communication device, it could be indicated whether or not the secondary communication device comprises a keyboard and/or a screen, and dependent on this information, the second control plane connection (or second non-access stratum connection) or the control plane-related interaction of the secondary communication device with the telecommunications network is established.

According to the present invention, it is furthermore preferred that a first specific data communication link—the first specific data communication link having a first set of parameters, especially involving one or a plurality of first communication bearer(s)—is established between the primary communication device and the telecommunications network, wherein in a third step, subsequent to the second step, a second specific data communication link—the second specific data communication link having a second set of parameters, especially involving one or a plurality of second communication bearer(s)—is established between the primary communication device and the telecommunications network, as a result of either the second control plane connection (or second non-access stratum connection) being established between the secondary communication device and the telecommunications network (i.e. especially the at least one network node of the core network) (according to the first embodiment of the present invention), or as a result of the connection between the primary communication device and the secondary communication device being used together with the first control plane connection between the primary communication device and the telecommunications network (i.e. as a result of the control plane-related interaction of the secondary communication device with the telecommunications network, the connection between the primary communication device and the secondary communication device being used together with the first control plane connection (or first non-access stratum connection) in order to transmit the at least one control information to or from the secondary communication device—according to the second embodiment of the present invention).

Thereby, it is advantageously possible that the user plane communication is modified or configured via a direct interaction of the secondary communication device with the telecommunications network (or a network node of the (core network of the) telecommunications network).

According to the present invention, it is furthermore preferred that in a fourth step, subsequent to the first step, a first configuration information is received by the primary communication device and/or a second configuration information is received by the secondary communication device wherein the primary communication device is configured in dependency of the first configuration information and/or the secondary communication device is configured in dependency of the second configuration information.

Via the first and/or second configuration information (being typically transmitted using the first control plane connection (or first non-access stratum connection) and/or using the second control plane connection (or second non-access stratum connection), or the control plane-related interaction of the secondary communication device with the telecommunications network, it is advantageously possible that not only the communication link between the primary communication device and the telecommunications network or between the secondary communication device and the telecommunications network can be modified or configured, but also the communication link between and/or the configuration of the primary communication device and/or the secondary communication device.

According to still a further preferred embodiment of the present invention the primary communication device, providing the network termination functionality with respect to the telecommunications network, is provided as a user equipment—especially in case that the telecommunications network is realized as a mobile communication network—, or as an integrated access device or a customer premises equipment—especially in case that the telecommunications network is realized as a fixed line telecommunications network, and wherein the secondary communication device is only indirectly connected to the telecommunications network, especially to the core network of the telecommunications network.

According to still a further preferred embodiment of the present invention, at least one tertiary communication device is indirectly connected to the telecommunications network via or using the secondary communication device as well as the primary communication device and using a local or short range connection, being a radio and/or wireline connection, between the tertiary communication device and the secondary communication device, wherein the secondary communication device is directly connected to the primary communication device, wherein the method comprises the following steps:

in a fifth step, preferably at least in part simultaneously to the first step, a further discovery operation regarding the tertiary communication device is performed, the further discovery operation being initiated either by the primary communication device, or by the secondary communication device, or by the tertiary communication device, or by the telecommunications network, in a sixth step, subsequent to the fifth step, at least one further control information being related to the tertiary communication device or being related to the result of the discovery operation is transmitted between, on the one hand, the telecommunications network, and, on the other hand, at least one out of the primary communication device, the secondary communication device, and the tertiary communication device, wherein especially a third control plane connection (or third non-access stratum connection) is established between the tertiary communication device and the telecommunications network (i.e. especially a corresponding network node or the at least one network node of the core network), wherein the at least one further control information, being related to the tertiary communication device (30) or being related to the result of the discovery operation, is transmitted using the third control plane connection (third non-access stratum connection), or a connection between the primary communication device and/or secondary communication device and the tertiary communication device is used together with the first control plane connection (first non-access stratum connection) and/or the second control plane connection (second non-access stratum connection) between the primary communication device or the secondary communication device, on the one hand, and the telecommunications network (i.e. especially a corresponding network node or the at least one network node of the core network), on the other hand, in order to transmit the at least one control information to or from the tertiary communication device, and wherein especially a first specific data communication link and/or a second specific data communication link—the first or second specific data communication link having a first or second set of parameters, especially involving one or a plurality of first or second communication bearer(s)—is established between the primary communication device and the telecommunications network, wherein in a seventh step, subsequent to the sixth step, a third specific data communication link—the third specific data communication link having a third set of parameters, especially involving one or a plurality of third communication bearer(s)—is established, as a result of the third control plane connection (third non-access stratum connection) being established between the tertiary communication device and the telecommunications network (e.g., a network node of the core network, especially the at least one network node of the core network).

Thereby, it is advantageously possible according to the present invention, that—in addition to the secondary communication device—a further communication device, namely a tertiary communication device can be connected to the telecommunications network via the primary communication device (and the secondary communication device). Likewise, it is possible and preferred according to the present invention that in addition to a tertiary communication device, also a quaternary communication device is connected (likewise via a local or short range communication link) with the tertiary communication device.

Furthermore according to the present invention, and independently from the example mentioned here, it is advantageously possible and preferred according to the present invention that a plurality of secondary communication devices are connected to the primary communication device, for example (besides the secondary communication device itself) one further secondary communication device or a plurality of further secondary communication devices, i.e. this further secondary communication device or these further secondary communication devices being in communication with the primary communication device via a local and typically short range communication link. Likewise according to the present invention, it is advantageously possible and preferred according to the present invention that a plurality of tertiary communication devices are connected to the secondary communication device (or to a further secondary communication device), for example (besides the tertiary communication device itself) one further tertiary communication device or a plurality of further tertiary communication devices, i.e. this further tertiary communication device or these further tertiary communication devices being in communication with the respective secondary communication device via a local and typically short range communication link.

According to a further embodiment of the present invention, the secondary communication device is identified by the telecommunications network, especially the core network of the telecommunications network, by a first identifier and/or wherein the tertiary communication device is identified by the telecommunications network, especially the core network of the telecommunications network, via a second identifier, wherein the first identifier and/or the second identifier is derived from the identity of the primary communication device, and wherein the first and/or second identifier is especially the result of an identifier translation and/or wherein the first and/or second identifier is especially an identifier information generated or assigned by the primary communication device.

Thereby, it is advantageously possible to distinguish the specific secondary communication device and/or the specific tertiary communication devices (especially those communication devices not having an identity module functionality (such as provided, e.g., by a subscriber identity module (SIM)) providing for a unique identity of the communication device) connected to a given primary communication device (from other similar or identically featured communication devices either also connected with the primary communication device or connected to other devices or user equipments acting as primary communication device).

Furthermore, the present invention relates to a telecommunications network for an enhanced and/or an adaptive communication between the telecommunications network and at least one secondary communication device via or using a primary communication device, wherein the primary communication device provides a network termination functionality with respect to the telecommunications network, involving a first control plane (or first non-access stratum) connection being established, by the telecommunications network (especially the core network), towards the primary communication device such that the telecommunications network is directly connected to the primary communication device, especially using the access network of the telecommunications network, and wherein the telecommunications network is indirectly connected to the secondary communication device, a local or short range connection, being a radio and/or wireline connection, being provided between the secondary communication device and the primary communication device, wherein the telecommunications network is configured such that:

a discovery operation regarding the secondary communication device is performed, the discovery operation being initiated either by the primary communication device, or by the secondary communication device, or by the telecommunications network, at least one control information, being related to the secondary communication device or being related to the result of the discovery operation, is transmitted between, on the one hand, the telecommunications network, and, on the other hand, at least one out of the primary communication device and the secondary communication device.

Thereby, it is advantageously possible to provide a telecommunications network such that the advantages described in relation to an exemplary embodiment of the inventive method can be realized and additional communication devices—besides the primary communication device—can be made known to the telecommunications network as well as get to know the telecommunications network.

Furthermore, the present invention relates to a system for an enhanced and/or an adaptive communication between a telecommunications network and at least one secondary communication device via or using a primary communication device, the system comprising the telecommunications network, the primary communication device, and the secondary communication device, wherein the primary communication device provides a network termination functionality with respect to the telecommunications network, involving a first control plane (or first non-access stratum) connection being established between the primary communication device of the telecommunications network such that the primary communication device is directly connected to the telecommunications network, and wherein the secondary communication device is indirectly connected to the telecommunications network, using a local or short range connection, being a radio and/or wireline connection, between the secondary communication device and the primary communication device, wherein the system is configured such that:

a discovery operation regarding the secondary communication device is performed, the discovery operation being initiated either by the primary communication device, or by the secondary communication device, or by the telecommunications network, at least one control information, being related to the secondary communication device or being related to the result of the discovery operation, is transmitted between, on the one hand, the telecommunications network, and, on the other hand, at least one out of the primary communication device and the secondary communication device.

Thereby, it is advantageously possible to provide a system such that the advantages described in relation to an exemplary embodiment of the inventive method can be realized and additional communication devices—besides the primary communication device—can be made known to the telecommunications network as well as get to know the telecommunications network.

Additionally, the present invention relates to a program comprising a computer readable program code which, when executed on a computer and/or on a primary communication device and/or on a secondary communication device and/or on a network node or on a plurality of network nodes of a telecommunications network, or in part on a primary communication device and/or in part on a secondary communication device and/or in part on a network node or on a plurality of network nodes of a telecommunications network, to perform an exemplary embodiment of the inventive method.

Still additionally, the present invention relates to a computer program product for an enhanced and/or an adaptive communication between a telecommunications network and at least one secondary communication device via or using a primary communication device, the computer program product comprising a computer program stored on a storage medium, the computer program comprising program code which, when executed on a computer and/or on a primary communication device and/or on a secondary communication device and/or on a network node or on a plurality of network nodes of a telecommunications network, or in part on a primary communication device and/or in part on a secondary communication device and/or in part on a network node or on a plurality of network nodes of a telecommunications network, to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown as an example of a telecommunications network according to the present invention. In the exemplary embodiment shown in FIG. 1, the telecommunications network 100 comprises—as a mobile communication network—an access network 110 and a core network 120, the core network 120 comprising at least one network node 121, but typically a plurality of different network nodes. The telecommunications network 100 is preferably a cellular telecommunications network comprising typically a plurality of network cells (or radio cells), wherein two neighboring network cells (or radio cells) are represented in FIG. 1 by means of reference signs 10 and 11. The telecommunications network 100 furthermore typically comprises a plurality of user equipments or telecommunication devices. The plurality of user equipments are referred to by means of reference signs 20, 21, wherein reference sign 20 refers to a first user equipment, and reference sign 21 refers to a second user equipment. The access network 110 of the telecommunications network 100 comprises, in the exemplary representation of FIG. 1, a first base station entity 111, serving the first radio cell 10. Furthermore, a second base station entity 112, serving the second radio cell 11, is schematically shown. The base transceiver stations 111, 112 are typically base stations or base station entities, e.g. a NodeB or an eNodeB base transceiver station.

In FIG. 1, a mobile communication network 100 is schematically shown as an example of a telecommunications network 100 that can also be provided as a fixed line telecommunications network 100, or as a hybrid telecommunications network, comprising parts providing the functionalities of a mobile communication network, and other parts providing the functionalities of a fixed line telecommunications network. According to the present invention, the telecommunications network comprises a user equipment 20 as a primary communication device 20, a secondary communication device 29 being connected to the primary communication device 20. According to the exemplary embodiment shown in FIG. 1, a tertiary communication device 30 is connected to the secondary communication device 29.

The invention is explained hereinafter based on the example of the secondary communication device 29 being connected to the primary communication device 20. Of course, also the second user equipment 21 could act as (a different) primary communication device, i.e. providing connectivity towards the telecommunications network 100 for a (different) secondary communication device. According to the present invention, the secondary communication device 29 is connected to the telecommunications network 100 via or using a primary communication device 20, the primary communication device 20 providing a network termination functionality (or network termination functionalities) with respect to the telecommunications network 100, involving a first control plane connection (or first non-access stratum connection) being established between the primary communication device 20 and a network node (or a corresponding network node) of the telecommunications network 100 (especially a network node of the core network 120 of the telecommunications network 100, i.e. in this case, the first control plane connection is established to a network node of the core network 120 responsible for that first control plane connection; this network node of the core network 120 could be identical to the a.m. network node 121 of the core network 120 but it could also be a different network node). Hence, the primary communication device 20 is directly connected to the telecommunications network 100 using the access network 110 of the telecommunications network 100.

The secondary communication device 29 is indirectly connected to the telecommunications network 100 via the primary communication device 20, a local or short range connection being used (typically involving a radio and/or wireline connection) between the secondary communication device 29 and the primary communication device 20. Examples of such radio and/or wireline connections include connections according to the Bluetooth standard and/or connections according to the different WLAN or WIFI standards, cabled connections, and the like. In any case, the secondary communication device 29 is not directly connected to the telecommunications network 100. This does not necessarily mean that the secondary communication device 29 is not able (e.g. physically or regarding the software modules it comprises) to be directly connected to the telecommunications network 100: In case the telecommunications network 100 is a mobile communication network, and the primary communication device 20 corresponds to a user equipment connected to that mobile communication network, the secondary communication device 29 could very well also be (or comprise) a user equipment having a wide area mobile communication radio interface, but the secondary communication device 29 could also correspond to a tablet device not having an activated or activatable wide area mobile communication radio interface.

According to the present invention, in a first step, a discovery operation regarding the secondary communication device 29 is performed, wherein the discovery operation is initiated either by the primary communication device 20, or by the secondary communication device 29, or by the telecommunications network 100 (especially a network node of the core network of the telecommunications network 100, in case of a mobile communication network). Furthermore, according to a second step, subsequent to the first step, at least one control information—that is related to the secondary communication device or that is related to the result of the discovery operation—is transmitted between, on the one hand, the telecommunications network 100 (e.g. the at least one network node 121 of the core network 120), and, on the other hand, at least one out of the primary communication device 20 and the secondary communication device 29. The discovery operation preferably involves the transmission of at least one of the endpoint address parameters of the second control plane connection, either on the side of the telecommunications network 100 or on the side of the secondary communication device 29. Furthermore, the discovery operation preferably comprises the transmission of a capability information and/or a device class information. Regarding the second step of an exemplary embodiment of the inventive method, the at least one control information (being related to the secondary communication device 29 or being related to the result of the discovery operation) is either transmitted via a second control plane connection, being established between the secondary communication device 29 and the telecommunications network 100 (especially the at least one network node 121 of the core network 120), or via a connection between the primary communication device 20 and the secondary communication device 29 being used together with the first control plane connection between the primary communication device 20 and the telecommunications network 100, especially (but not necessarily) the at least one network node 121 of the core network 120—a different corresponding network node of the telecommunications network (or of the core network 120) could be used as well for the first control plane connection.

Regarding the tertiary communication device 30, a similar approach as compared to the secondary communication device is performed: In order to connect the tertiary communication device 30 to the telecommunications network 100 (using a local or short range communication link with the secondary communication device 29, being itself only indirectly connected to the telecommunications network 100, namely via the primary communication device 20), a fifth step, comprising a further discovery operation regarding the tertiary communication device 30 is performed, and at least one further control information, being related to the tertiary communication device 30 or being related to the result of the discovery operation, is transmitted between, on the one hand, the telecommunications network 100 (e.g. at least one network node 121 of the core network 120), and, on the other hand, at least one out of the primary communication device 20, the secondary communication device 29, and the tertiary communication device 30.

According to a non-limiting example, a tablet devices is connected (as a secondary communication device 29) to a mobile phone (acting as primary communication device 20 and being connected to a mobile communication network acting as telecommunications network 100). In case that a user of the tablet device intends to watch a movie, it is advantageously possible according to the present invention that the tablet device (despite the fact that it is not the terminating device towards the telecommunications network 100)—after having been discovered by the telecommunications network 100, i.e. after having performed the discovery operation—uses the second control plane connection, e.g. towards a mobility management entity (acting as network node 121 of the core network 120 of the telecommunications network 100) of the mobile communication network 100, to request from the telecommunications network 100 (on the control plane, i.e. not involving an application server) to provide the respective transmission resources (in terms of a corresponding data connection typically involving a bearer).

According to another non-limiting example, a tablet device is connected (as a secondary communication device 29) to a router entity or integrated access device (acting as primary communication device 20 and being connected to a fixed line communication network acting as telecommunications network 100). In case that a user of the tablet device intends to watch a movie using a movie streaming service provider, there is typically a receiver entity of the movie streaming service provider connected to the router entity or integrated access device. The receiver entity therefore also acts as a secondary communication device (i.e. a further secondary communication device, besides the secondary communication device being the tablet device). According to the present invention, it is advantageously possible that the tablet device (despite the fact that it is not the terminating device towards the telecommunications network 100)—after having been discovered by the telecommunications network 100 (along with the receiver entity as the further secondary communication device), i.e. after having performed the discovery operation—uses the second control plane connection, e.g. towards a network node instructing the router entity (or integrated access device), i.e. the primary communication device 20, to modify the firewall configuration such that the movie data stream is directly streamed to the tablet device 29.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for communication between a telecommunications network and a secondary communication device via or using a primary communication device,
   wherein the primary communication device provides a network termination functionality with respect to the telecommunications network, involving a first control plane connection being established between the primary communication device and the telecommunications network such that the primary communication device is directly connected to the telecommunications network, and
   wherein the secondary communication device is indirectly connected to the telecommunications network, using a local or short range connection between the secondary communication device and the primary communication device, wherein the local or short range connection between the secondary communication device and the primary communication device includes a radio connection or a wireline connection,
   the method comprising:
   in a first step, performing a discovery operation regarding the secondary communication device, the discovery operation being initiated either by the primary communication device, by the secondary communication device, or by the telecommunications network; and
   in a second step, subsequent to the first step, transmitting control information, being related to the secondary communication device or being related to the result of the discovery operation, between, on the one hand, the telecommunications network, and, on the other hand, the primary communication device and/or the secondary communication device;
   wherein a first specific data communication link, the first specific data communication link having a first set of parameters involving one or more first communication bearer(s), is established between the primary communication device and the telecommunications network; and
   wherein the method further comprises: in a third step, subsequent to the second step, establishing a second specific data communication link, the second specific data communication link having a second set of parameters involving one or more second communication bearer(s), between the primary communication device and the telecommunications network, as a result of a second control plane connection being established between the secondary communication device and the telecommunications network, or as a result of a connection between the primary communication device and the secondary communication device being used together with the first control plane connection between the primary communication device and the telecommunications network.

2. The method according to claim 1, wherein the second control plane connection is established between the secondary communication device and the telecommunications network, and wherein the control information is transmitted using the second control plane connection.

3. The method according to claim 1, wherein the connection between the primary communication device and the secondary communication device is used together with the first control plane connection between the primary communication device and the telecommunications network in order to transmit the control information to or from the secondary communication device.

4. The method according to claim 1, further comprising:
subsequent to the first step, receiving, by the primary communication device, first configuration information and/or receiving, by the secondary communication device, second configuration information, wherein the primary communication device is configured based on the first configuration information and/or the secondary communication device is configured based on the second configuration information.

5. The method according to claim 2, wherein the discovery operation involves transmission of at least one endpoint address parameter of the second control plane connection by:
transmitting an endpoint address of the secondary communication device towards the telecommunications network; and/or
transmitting an endpoint address of a corresponding network node of the telecommunications network terminating the second control plane connection towards the primary communication device.

6. The method according to claim 3, wherein the discovery operation involves transmission of at least one endpoint address parameter of the connection between the primary communication device and the secondary communication device by:
transmitting an endpoint address of the secondary communication device towards the telecommunications network; and/or
transmitting an endpoint address of a corresponding network node of the telecommunications network terminating the first control plane connection towards the primary communication device.

7. The method according to claim 1, wherein the discovery operation involves transmission of capability information or device class information regarding the secondary communication device.

8. The method according to claim 1, wherein the primary communication device is a user equipment or an integrated access device or a customer premises equipment, and wherein the secondary communication device is indirectly connected to a core network of the telecommunications network.

9. The method according to claim 1, wherein a tertiary communication device is indirectly connected to the telecommunications network via or using the secondary communication device as well as the primary communication device, and using a local or short range connection between the tertiary communication device and the secondary communication device, wherein the local or short range connection between the tertiary communication device and the secondary communication device includes a radio connection or a wireline connection;
wherein the secondary communication device is directly connected to the primary communication device;
wherein the method further comprises:
performing a further discovery operation regarding the tertiary communication device, the further discovery operation being initiated by the primary communication device, by the secondary communication device, by the tertiary communication device, or by the telecommunications network; and
transmitting further control information, being related to the tertiary communication device or being related to the result of the further discovery operation, between, on the one hand, the telecommunications network, and, on the other hand, the primary communication device, the secondary communication device and/or the tertiary communication device;
wherein:
a third control plane connection is established between the tertiary communication device and the telecommunications network, wherein the further control information, being related to the tertiary communication device or being related to the result of the discovery operation, is transmitted using the third control plane connection; or
a connection between the primary communication device and/or secondary communication device and the tertiary communication device is used together with the first control plane connection and/or the second control plane connection between the primary communication device or the secondary communication device, on the one hand, and the telecommunications network, on the other hand, in order to transmit the control information to or from the tertiary communication device;
wherein the method further comprises: establishing a third specific data communication link as a result of the third control plane connection being established between the tertiary communication device and the telecommunications network or as a result of the connection between the primary communication device and/or secondary communication device and the tertiary communication device, wherein the third specific data communication link has a third set of parameters involving one or more third communication bearer(s).

10. The method according to claim 9, wherein:
the secondary communication device is identified by a core network of the telecommunications network via a first identifier; and/or
the tertiary communication device is identified by the core network of the telecommunications network via a second identifier;
wherein the first identifier and/or the second identifier is derived from the identity of the primary communication device; and
wherein:
the first identifier and/or the second identifier is the result of an identifier translation; and/or
the first identifier and/or the second identifier is an identifier information generated or assigned by the primary communication device.

11. A system for communication between a telecommunications network and a secondary communication device via or using a primary communication device, the system comprising:
the telecommunications network;
the primary communication device; and
the secondary communication device;
wherein the primary communication device is configured to provide a network termination functionality with respect to the telecommunications network, involving a first control plane connection being established between the primary communication device and the telecommunications network such that the primary communication device is directly connected to the telecommunications network;

wherein the secondary communication device is indirectly connected to the telecommunications network using a local or short range connection between the secondary communication device and the primary communication device, wherein the local or short range connection includes a radio connection or a wireline connection;

wherein the primary communication device, the secondary communication device, or the telecommunications network is configured to initiate a discovery operation regarding the secondary communication device;

wherein the telecommunications network or the primary and/or secondary communication device is configured to transmit control information related to the secondary communication device or related to the result of the discovery operation;

wherein a first specific data communication link, the first specific data communication link having a first set of parameters involving one or more first communication bearer(s), is established between the primary communication device and the telecommunications network; and wherein the primary communication device and the telecommunications network are further configured to establish a second specific data communication link, the second specific data communication link having a second set of parameters involving one or more second communication bearer(s), between the primary communication device and the telecommunications network, as a result of a second control plane connection being established between the secondary communication device and the telecommunications network, or as a result of a connection between the primary communication device and the secondary communication device being used together with the first control plane connection between the primary communication device and the telecommunications network.

12. A non-transitory, computer-readable medium having processor-executable instructions stored thereon for communication between a telecommunications network and a secondary communication device via or using a primary communication device, wherein the primary communication device provides a network termination functionality with respect to the telecommunications network, involving a first control plane connection being established between the primary communication device and the telecommunications network such that the primary communication device is directly connected to the telecommunications network, and wherein the secondary communication device is indirectly connected to the telecommunications network, using a local or short range connection between the secondary communication device and the primary communication device, wherein the local or short range connection between the secondary communication device and the primary communication device includes a radio connection or a wireline connection, wherein the processor-executable instructions, when executed, facilitate the following:

in a first step, performing a discovery operation regarding the secondary communication device, the discovery operation being initiated either by the primary communication device, by the secondary communication device, or by the telecommunications network; and in a second step, subsequent to the first step, transmitting control information, being related to the secondary communication device or being related to the result of the discovery operation, between, on the one hand, the telecommunications network, and, on the other hand, the primary communication device and/or the secondary communication device;

wherein a first specific data communication link, the first specific data communication link having a first set of parameters involving one or more first communication bearer(s), is established between the primary communication device and the telecommunications network; and wherein the processor-executable instructions, when executed, further facilitate: in a third step, subsequent to the second step, establishing a second specific data communication link, the second specific data communication link having a second set of parameters involving one or more second communication bearer(s), between the primary communication device and the telecommunications network, as a result of a second control plane connection being established between the secondary communication device and the telecommunications network, or as a result of a connection between the primary communication device and the secondary communication device being used together with the first control plane connection between the primary communication device and the telecommunications network.

* * * * *